US010576597B2

(12) United States Patent
Stoneback et al.

(10) Patent No.: US 10,576,597 B2
(45) Date of Patent: Mar. 3, 2020

(54) TAPERED TOOL HOLDER FIXTURE ASSEMBLY

(71) Applicants: John Wayne Stoneback, Madison, OH (US); Craig Fischer, Chardon, OH (US)

(72) Inventors: John Wayne Stoneback, Madison, OH (US); Craig Fischer, Chardon, OH (US)

(*) Notice: Subject to any disclaimer, the term of this patent is extended or adjusted under 35 U.S.C. 154(b) by 274 days.

(21) Appl. No.: 15/685,623

(22) Filed: Aug. 24, 2017

(65) Prior Publication Data

US 2018/0071879 A1     Mar. 15, 2018

Related U.S. Application Data

(60) Provisional application No. 62/385,611, filed on Sep. 9, 2016.

(51) Int. Cl.
| | |
|---|---|
| *B23Q 17/00* | (2006.01) |
| *G01B 3/56* | (2006.01) |
| *B23Q 3/12* | (2006.01) |
| *G01B 5/24* | (2006.01) |
| *G01B 21/22* | (2006.01) |

(52) U.S. Cl.
CPC ............ *B23Q 17/005* (2013.01); *G01B 3/56* (2013.01); *B23Q 3/12* (2013.01); *G01B 5/24* (2013.01); *G01B 21/22* (2013.01)

(58) Field of Classification Search
CPC ... G01B 3/34; G01B 3/56; G01B 5/24; G01B 21/22; B23Q 17/002; B23Q 17/005
USPC ........ 73/104, 865.9; 33/1 BB, 531, 532, 551
See application file for complete search history.

(56) References Cited

U.S. PATENT DOCUMENTS 8,998,545 B2 *  4/2015  Stoneback ............ B23B 31/006
                                                    409/232
9,205,524 B2 * 12/2015  Stoneback ........... B23Q 17/005

* cited by examiner

*Primary Examiner* — Benjamin R Schmitt
(74) *Attorney, Agent, or Firm* — Tarolli, Sundheim, Covell & Tummino LLP (57) ABSTRACT

A tapered tool holder fixture for installing a retention knob into a tool holder and to determine whether the retention knob has produced distortions in a tool holder surface. A support stand supports a test gauge assembly that includes a mounting ring to which a tool holder is clamped, a gauge portion for receiving a tool holder surface and a camming ring for moving the gauge portion into and out of engagement with the tool holder surface. The mounting ring, camming ring and gauge portion are held together by bolts which allow the relative movement between the gauge portion and a tool holder held by the mounting ring and allow relative rotation between the camming and mounting rings whereby a rotatable detent arrangement moves the gauge portion towards and away from the tool holder. An indicator monitors the position of the gauge portion in order to detect distortions.

18 Claims, 12 Drawing Sheets

TAPERED TOOL HOLDER FIXTURE ASSEMBLY

RELATED APPLICATION

This application claims the benefit of U.S. Provisional Patent Application Ser. No. 62/385,611, filed on Sep. 9, 2016, the disclosure of which is entirely incorporated herein by reference.

TECHNICAL FIELD

The present invention relates generally to machine tools and, in particular, to a tool holder fixture assembly which can be used to properly install a retention knob into a tool holder, as well as measure distortions in a tapered tool holder surface if such distortions are created by the installation of the retention knob.

BACKGROUND ART

U.S. Pat. No. 8,998,545 illustrates an inventive retention knob for a tool holder which substantially eliminates distortions in a tool holder tapered surface during installation of the retention knob. The '545 patent is hereby incorporated by reference.

U.S. Pat. No. 9,205,524 discloses a test gauge for checking the tapered surface of a tool holder to determine whether distortions in the surface have been created by a retention knob that is installed in the tool holder. The '524 patent is hereby incorporated by reference.

Disclosure of Invention

The present invention provides a new and improved tapered tool holder fixture assembly which can be used to both properly install a retention knob and to test the tool holder for distortions in its tapered surface. According to the invention, the test fixture assembly includes a pedestal that comprises a base that is rigidly attached to a support surface and a column or upright that extends upwardly from the base and mounts a tool holder gauging/test assembly that is adapted to receive a tool holder.

The present invention provides a tapered tool holder test fixture for determining whether a tapered surface forming part of a tool holder has been distorted due to the improper installation of a retention knob. The fixture includes a support stand that supports a test gauge assembly. The test gauge assembly, in turn, includes a tool holder mount to which a tool holder is rigidly attached, a gauge block engageable with a tapered surface forming part of the tool holder and a camming member for moving the gauge block into engagement with the tool holder tapered surface. The gauge block includes a precisely machine tapered recess for precisely receiving the tapered tool shank of the tool holder. The tool holder mount, gauge block and camming member are held together in operative engagement by a plurality longitudinally extending bolt.

The bolts are arranged to allow the gauge block to move towards and away from the tool holder mount. The camming member is movable between a tool holder engaged position and a tool holder disengaged position. A measuring indicator, which may be a dial indicator, monitors a position of the gauge block with respect to a reference point on the tool holder when the gauge block is engaging the tapered surface of the tool holder. If the position of the gauge block with respect to the reference point changes when a retention knob is installed in the tool holder, it is an indication that unwanted distortions in the tool holder tapered surface has occurred due to the installation of the retention knob.

According to a feature of this embodiment, the tool holder mount, gauge block and camming member are axially aligned about a common axis and the camming member is rotatable about the axis to cause the gauge block to move towards and away from the tool holder tapered surface. According to another feature of this embodiment, the tool holder test fixture includes a detent arrangement that comprises at least one protrusion or detent and at least one associated recess for receiving the detent or protrusion. The associated recess and protrusion being arranged such that relative movement between the detent and the associated recess causes the gauge block to move towards and away from the tool holder held by the tool holder mount. In the illustrated embodiment, the detent is formed on the camming member and the associated recess is formed in the gauge block. In a more preferred embodiment, the camming member includes three detents and the gauge block includes three recesses associated with the three detents.

According to a feature of this embodiment, the camming member includes arcuate slots through which the longitudinally extending bolts extend; the slots allow the camming member to rotate a predetermined amount with respect to the tool holder mount and the gauge block.

According to another feature of the invention, the support stand rotatably supports the test gauge assembly.

According to the preferred embodiment, the tool holder mount, gauge block and camming member are initially formed from a unitary block of material such as steel or aluminum. The block of material is machined to define the exterior surfaces of the tool holder mount, gauge block and camming member. The bores for receiving the longitudinally extending bolts are machined into the block whereupon the block is then cut into three individual pieces that define the tool holder mount, gauge block and camming member. By separating/cutting the three individual pieces from a unitary block after the longitudinal bolts are machined, precise alignment of the three components are assured.

According to the invention, the gauge block is biased towards engagement with the tool holder tapered surface by springs held by the longitudinally extending bolts. In the preferred and illustrated embodiment, three longitudinal extending bolts are utilized, each bolt carrying a biasing spring for urging the gauge block towards engagement with a tool holder held by the tool holder mount.

According to other aspects of the invention, the gauging assembly includes a mounting ring that is rigidly attached to a carrier plate rigidly mounted to the upright. The gauging assembly further includes a tapered gauging cylinder or annular ring which is slidably attached to the mounting ring. A cam ring is located intermediate the mounting ring and the gauging cylinder and includes structures such that when the cam ring is rotated, it causes the tapered gauging cylinder to move away from the cam ring.

In the preferred and illustrated embodiment, the cam ring includes radial directed protrusions which are engageable with complementally-formed radial recesses in the cylinder, such that when the protrusions are received by the recesses, the cam ring and gauge cylinder/ring closely abut each other. When the protrusions are moved out of the recesses (by rotation of the cam ring), the gauge cylinder is moved away from the cam ring and, as a result, the tapered surface of the tool holder is disengaged by a complementally-formed tapered surface formed in the tapered gauge cylinder.

A dial indicator is mounted to the gauge cylinder and includes an operating member that moves parallel to an axis of the cylinder and includes a plunger tip that is engageable with a bottom surface of the mounting ring. In effect, the dial indicator can measure a relative distance between the gauge cylinder and the mounting ring.

In order to determine whether a distortion has been created in the tapered tool holder surface, a tool holder is installed into the test fixture and the distance, as measured by the dial indicator, is noted. The cam ring is then rotated to separate the cylinder from the tool holder tapered surface and a retention knob is then installed and properly torqued. The cam ring is then returned to its initial or test position and the reading on the dial indicator is noted. If the retention knob did not produce a distortion in the tapered tool holder surface, the dial indicator reading after installation of the retention knob should be substantially the same as it was before the retention knob was installed. If a distortion has been created, the dial indicator will so indicate because the distortion in the tool holder surface will not allow the gauge cylinder/ring to return to its initial position.

Additional features of the invention will become apparent and a fuller understanding obtained by reading the following detailed description made in connection with the accompanying drawings.

DETAILED DESCRIPTION

Figure 1:
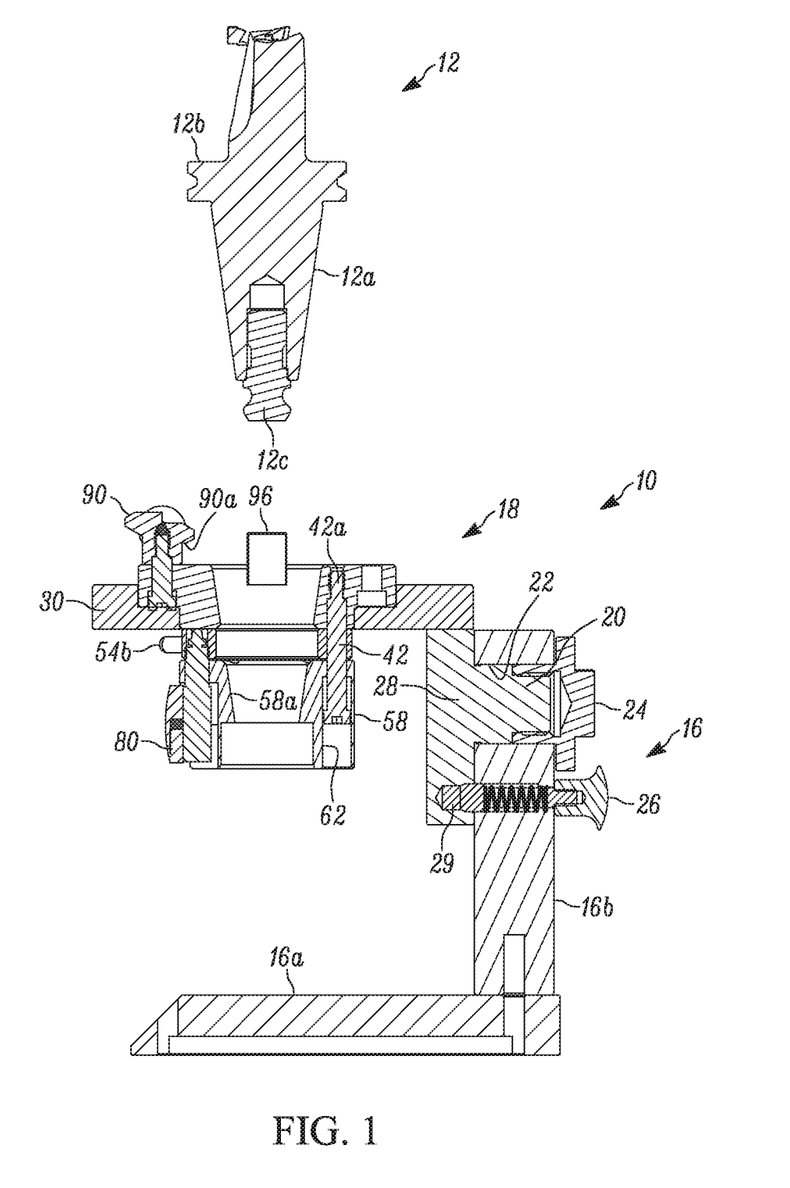
FIG. 1 is a sectional view of a tapered tool holder fixture assembly constructed in accordance with a preferred embodiment of the invention and showing a tool holder receivable by the assembly.

FIG. 1 illustrates the overall construction of a tapered tool holder test assembly 10 constructed in accordance with a preferred embodiment of the invention. The test fixture assembly 10 is adapted to receive a tool holder 12. The tool holder 12 is of known construction and includes a tapered tool holder surface 12a, drive flange 12b and a retention knob 12c. As is known, the tapered surface 12a is received by a tapered bore in a machine tool spindle and is rigidly held in the spindle bore by a gripper which engages the retention knob 12c. Additional details regarding the operations of the tool holder 12 and its engagement by the machine tool can be found in U.S. Pat. Nos. 8,998,545 and 9,205,524 which are hereby incorporated by reference.

Figure 2:
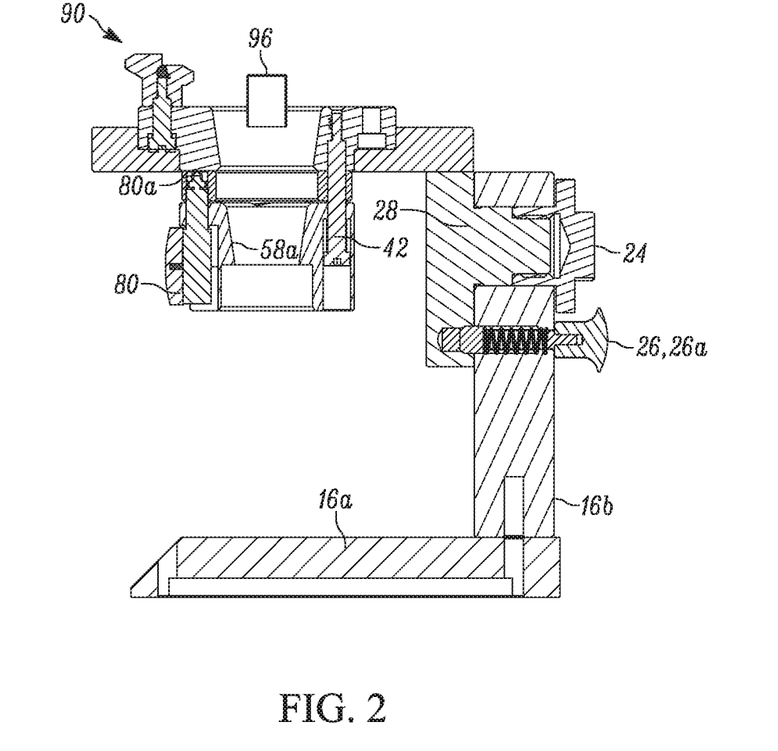
FIG. 2 is another sectional view of the tapered tool holder fixture assembly.
Figure 3:
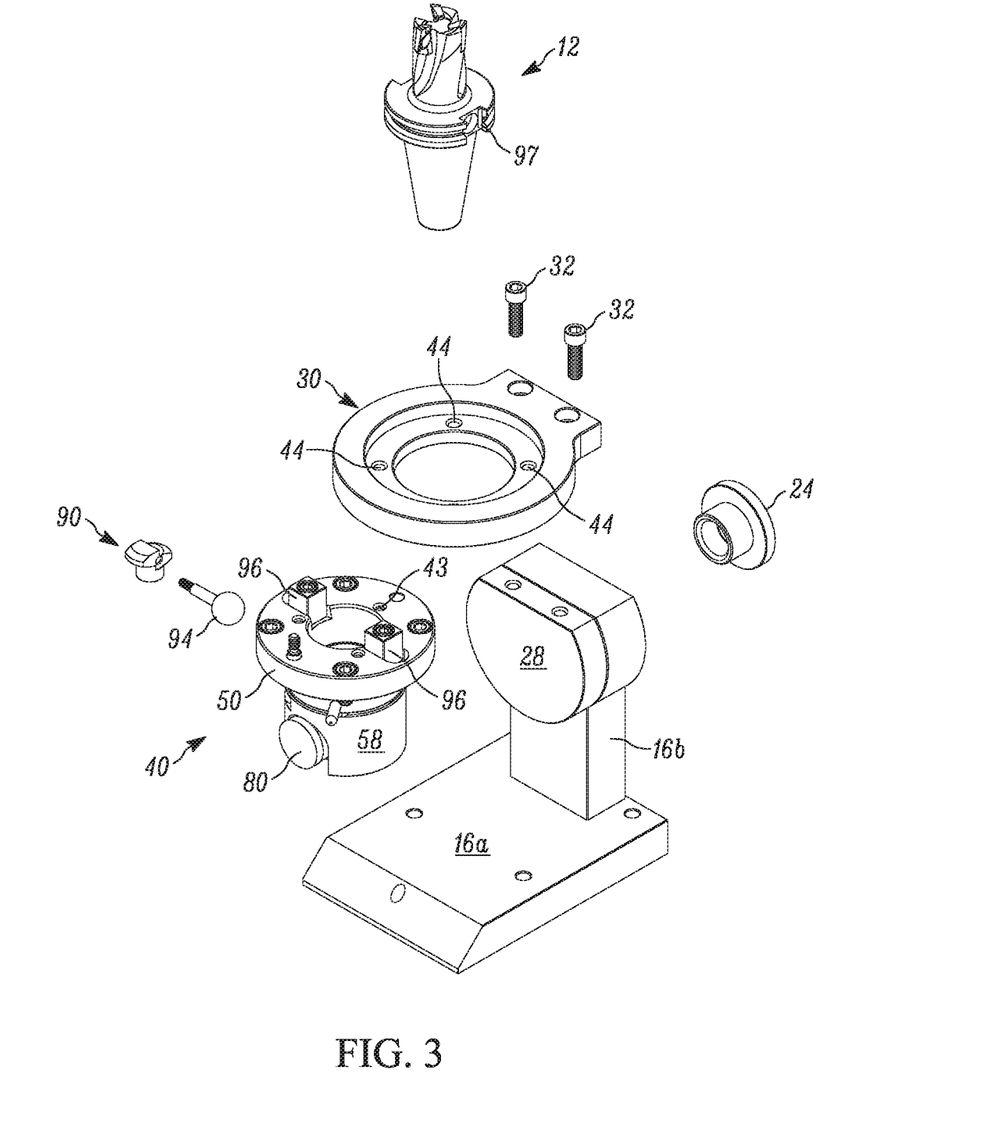
FIG. 3 is an exploded perspective view of the tapered tool holder fixture assembly and tool holder shown in FIG. 1.
Figure 4:
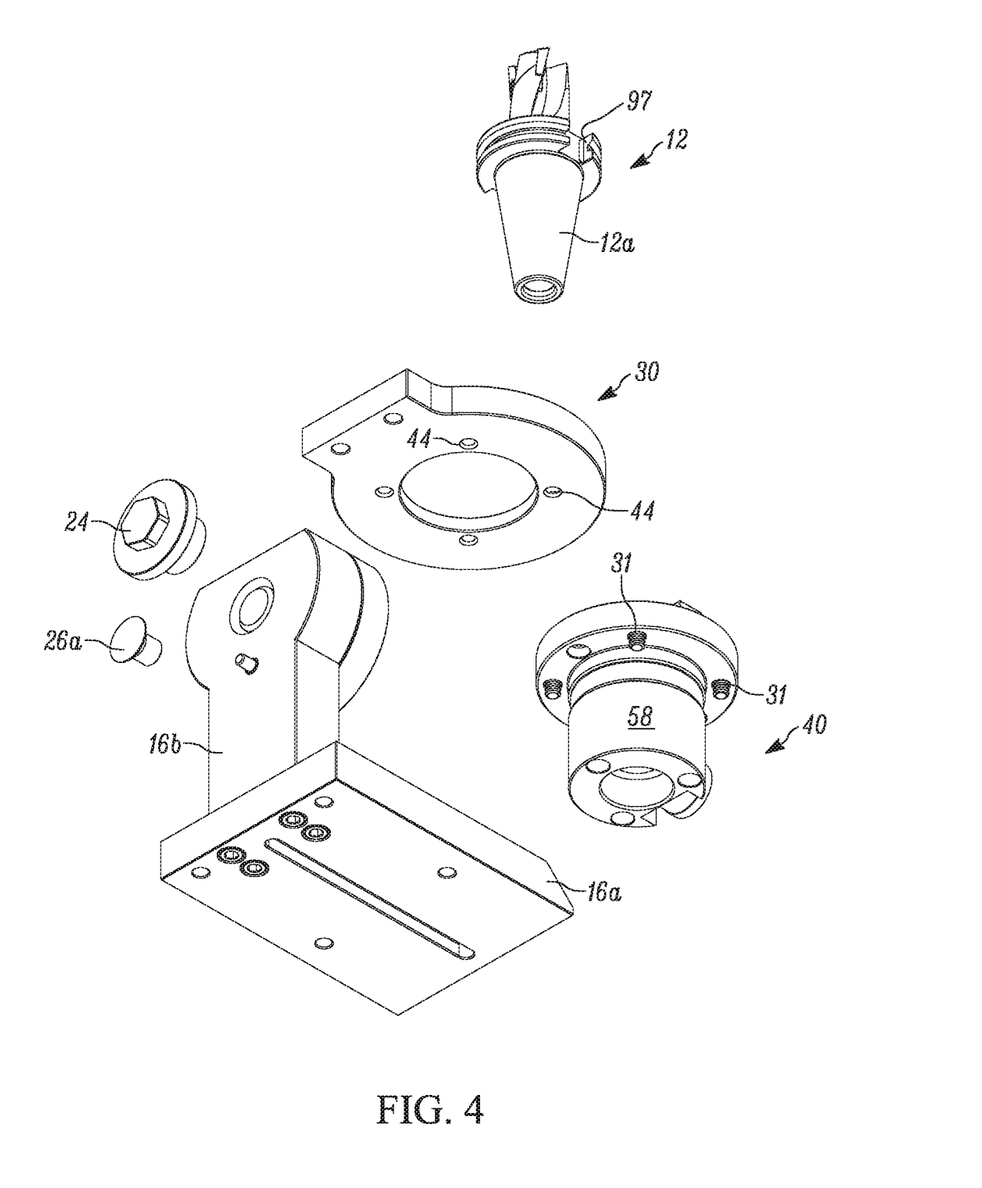
FIG. 4 is another exploded perspective view of the tapered tool holder fixture assembly and tool holder shown in FIG. 3.
Figure 5:
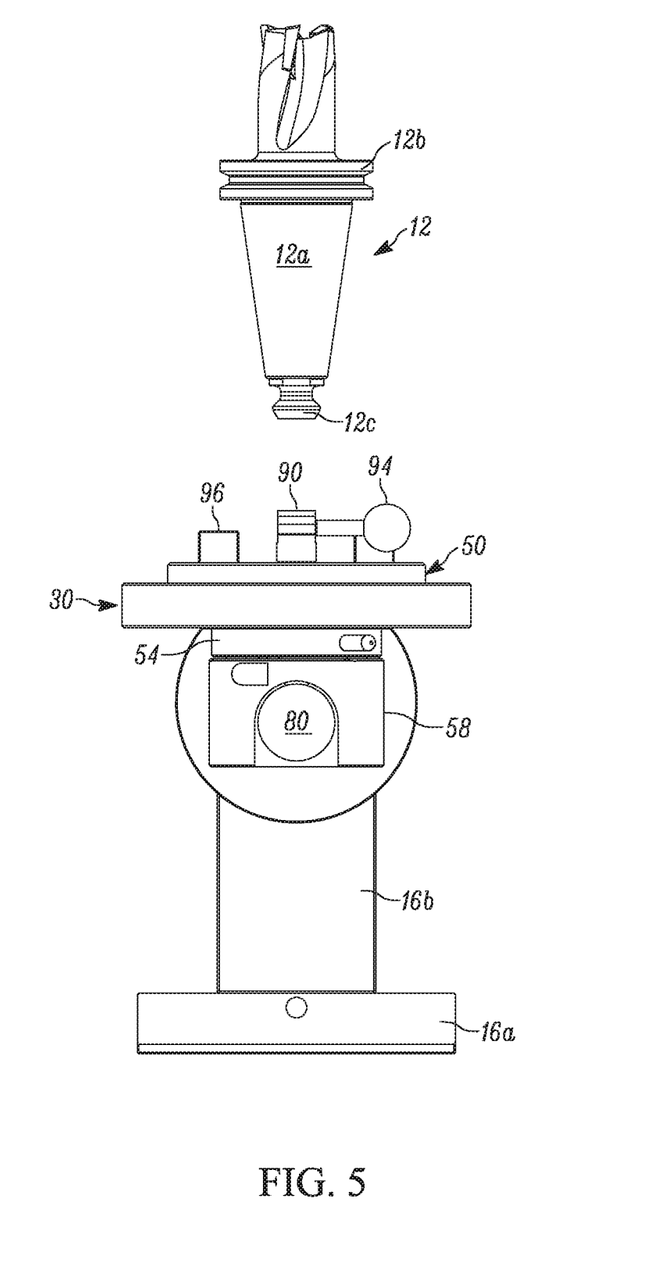
FIG. 5 is a side elevational view of the tapered tool holder fixture assembly and tool holder shown in FIG. 1.

Referring also to FIGS. 2 and 3, the tapered tool holder test assembly includes a pedestal 16 which rigidly mounts a testing fixture subassembly 18 for receiving, testing and/or assembling the tool holder 12. The pedestal 16 includes a base or foot 16a which can be rigidly attached to a mounting surface (not shown) and a vertically extending column or upright 16b. The test fixture subassembly 18 is rotatably mounted to the upright 16. The fixture subassembly 18 includes an annular boss 20 which is received in an associated bore 22 formed in the upright 16b. A locking nut 24 threadedly engages the boss 20 and holds the test fixture subassembly 18 to the upright 16. This mounting allows rotation of the test fixture subassembly 18 and a spring loaded locking pin 26 (having knob 26a) is operative to lock the test fixture subassembly 18 in one of several positions. The test fixture 18 includes a mounting portion 28 which defines the annular boss 20 and also defines several blind bores 29 which are engageable by the locking pin 26. In general, the invention contemplates allowing the test fixture subassembly 18 to rotate 45° in either direction from the position shown in FIG. 1.

Referring also to FIG. 3, the test fixture includes a carrier plate 30 which is secured to the mounting portion 28 by a pair of fasteners 32. A gauge assembly 40 is secured to the carrier plate 30 by elongate and vertically extending (as viewed in FIG. 2) bolts 42 having threaded ends 42a (shown best in FIG. 6) that engage threaded bores 43 in a mounting ring 50 (shown best in FIG. 3).

Figure 6:
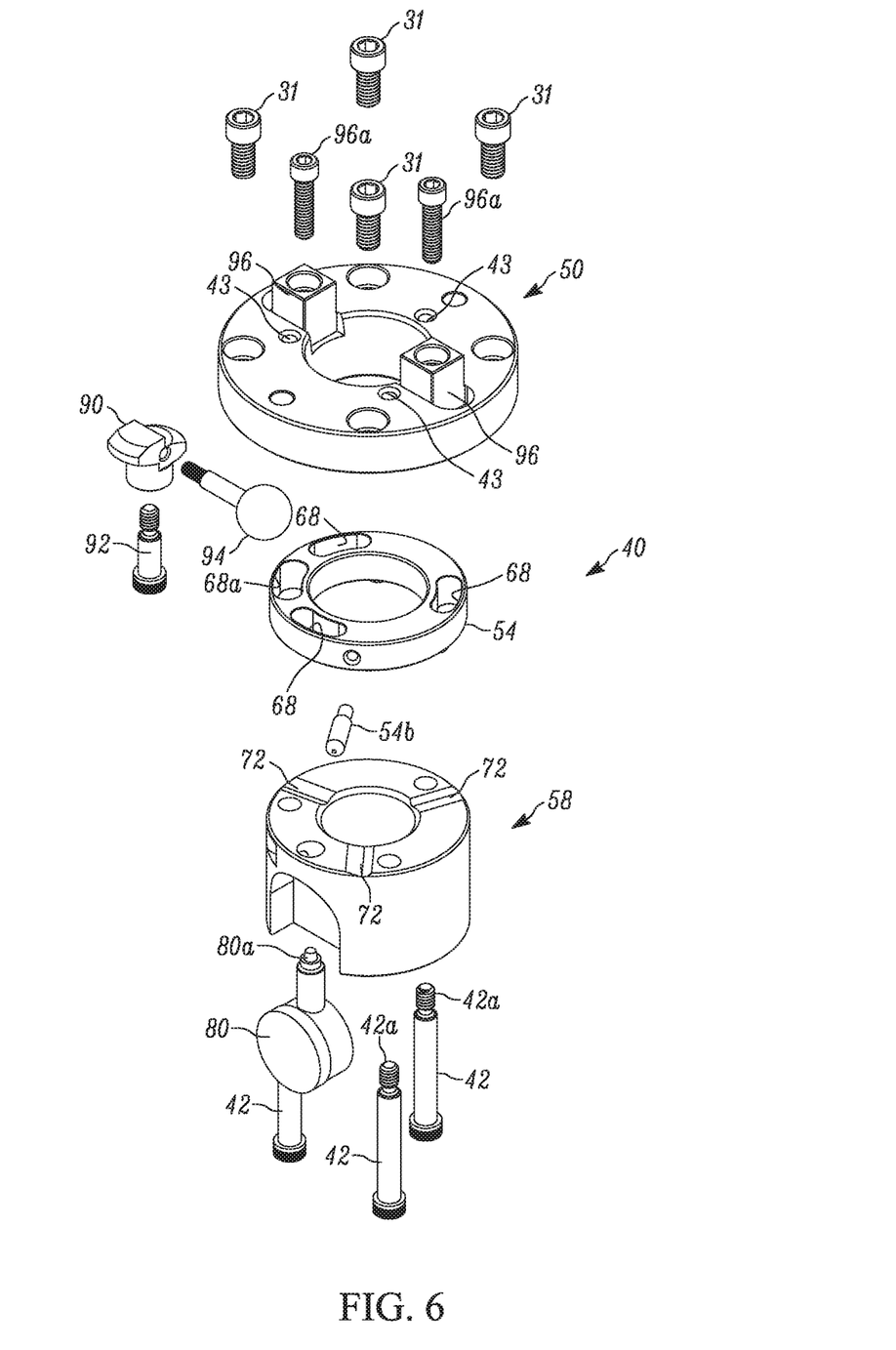
FIG. 6 is a exploded perspective view of a gauge assembly constructed in accordance with a preferred embodiment of the invention.

Referring to FIG. 6, the construction of the gauge/testing assembly 40 is illustrated. In a preferred embodiment, the gauge/testing assembly 40 includes the mounting ring 50 which is secured in a complementally-shaped recess formed in the top of the carrier plate 30 and is secured thereto. The mounting ring 50 is secured to the carrier plate 30 by bolts 31 which engage threaded bores 44 in the carrier plate 30.

Figure 9:
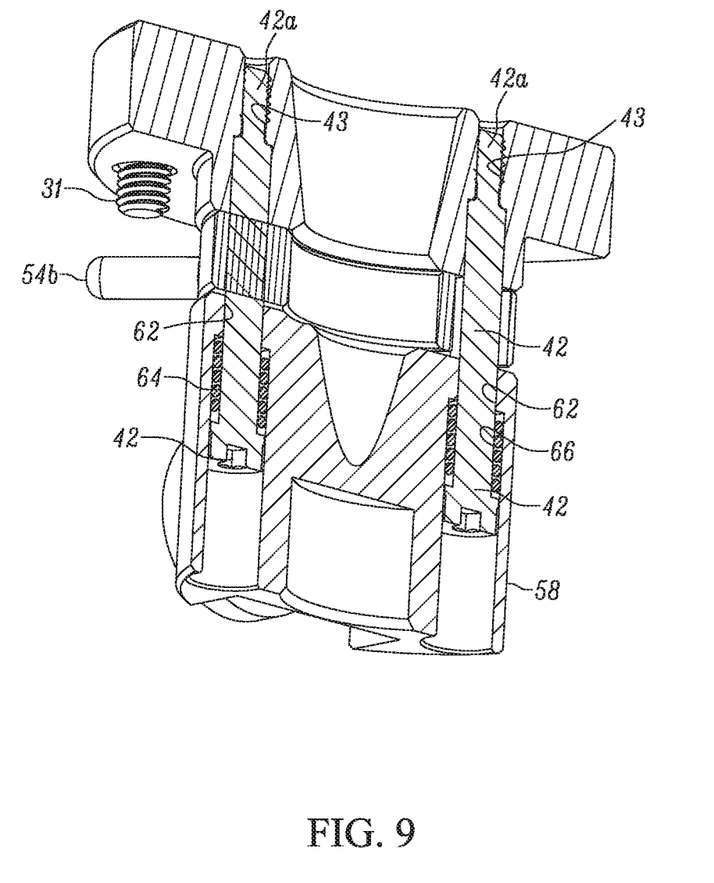
FIG. 9 is a sectional view of the gauge assembly shown in FIG. 8.
Figure 10:
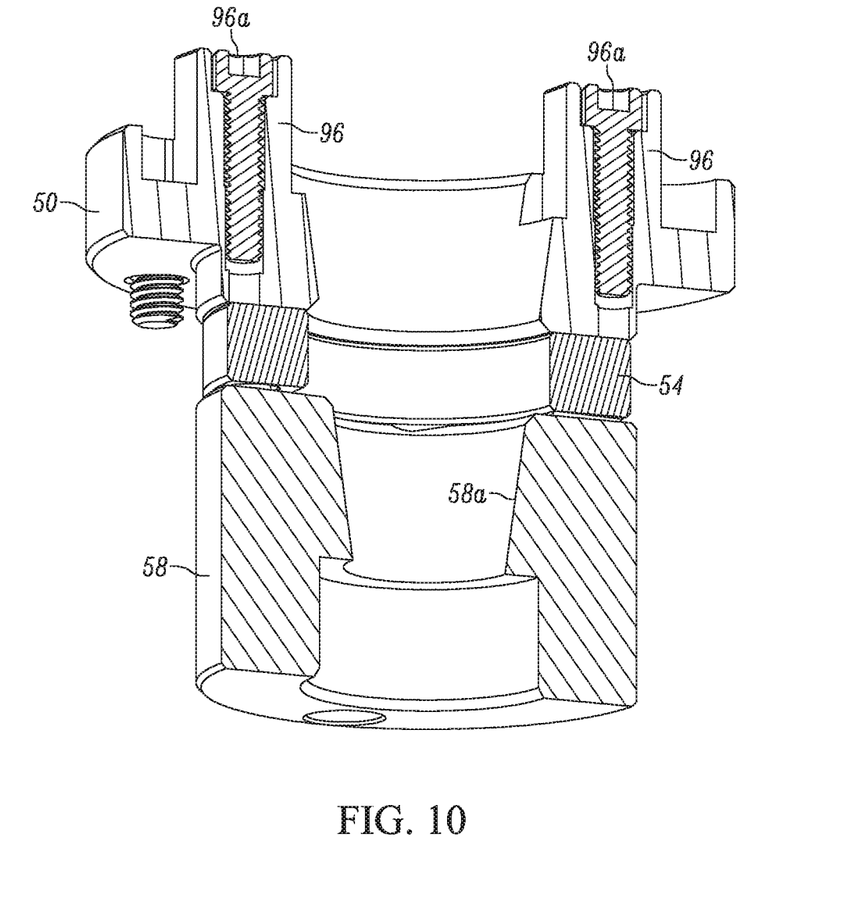
FIG. 10 is another sectional view of the gauge assembly shown in FIG. 8.
Figure 11:
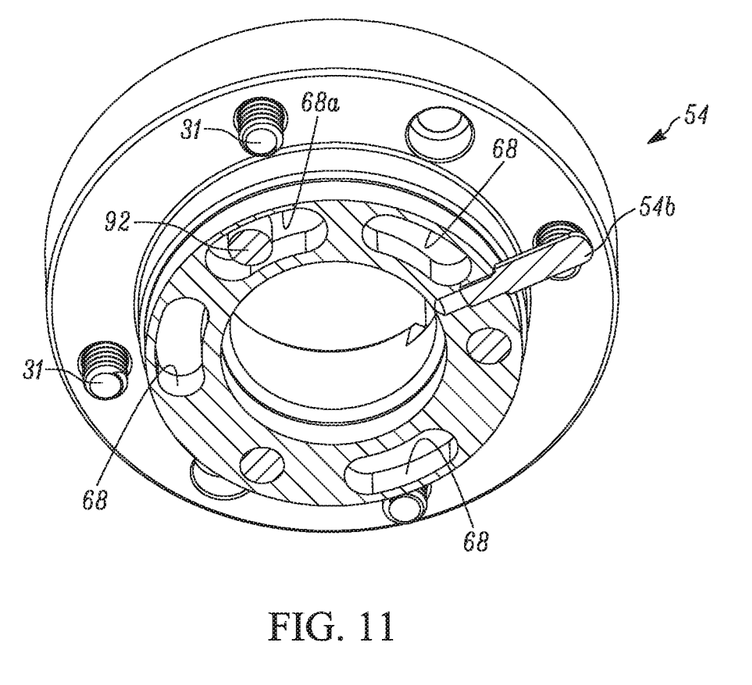
FIG. 11 is a perspective view, partially in section of a cam ring forming part of the gauge assembly shown in FIG. 8.
Figure 12:
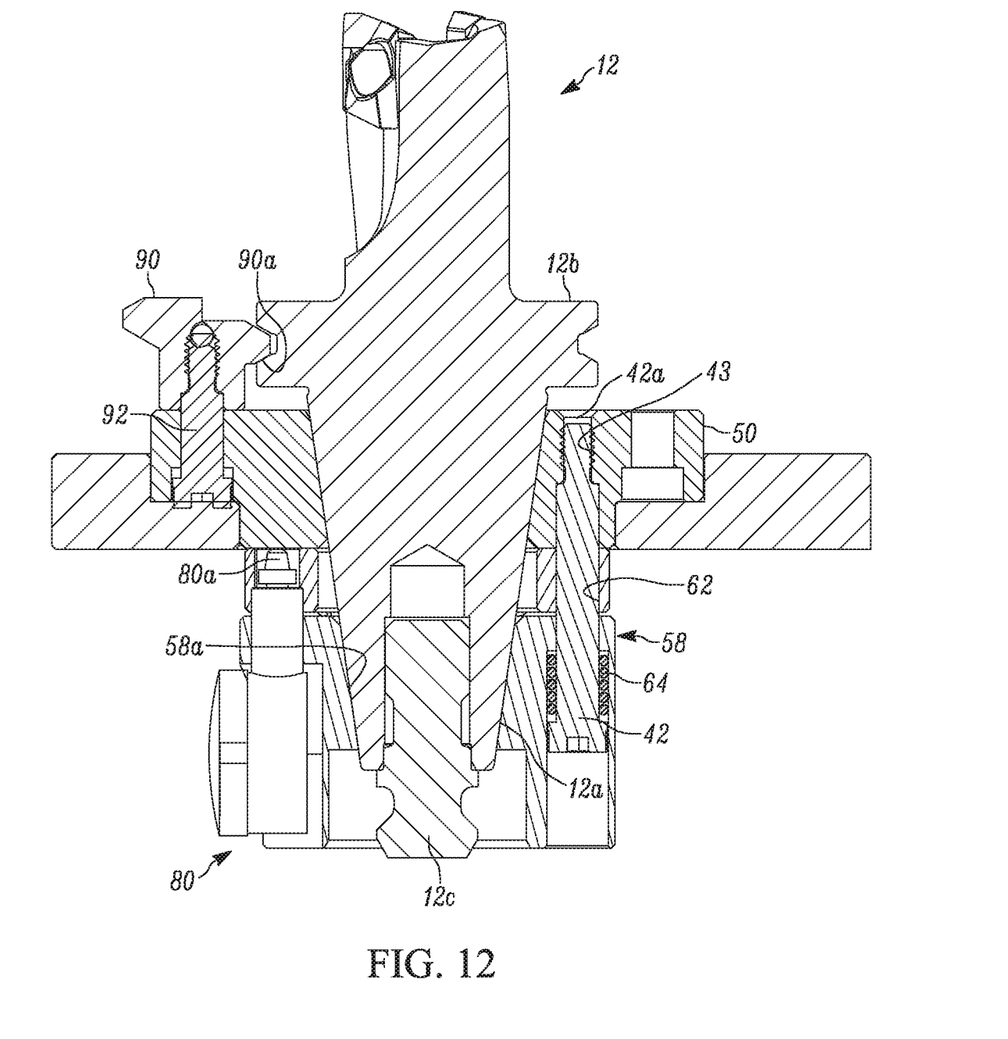
FIG. 12 is a fragmentary sectional view of the tapered tool holder fixture assembly with a tool holder installed.

The gauge/testing assembly 40 also includes a cam ring 54 and a gauging cylinder or ring 58. The cam ring 54 is rotatable with respect to the mounting ring 50 and the gauging cylinder 58. The cam ring 54 is rotatable between a testing position and a tool holder released position. The mounting ring 50, the cam ring 54 and the gauging cylinder 58 shown in FIG. 6, are clamped together by the longitudinal bolts 42 which extend upwardly and threadedly engage associated threaded bores 43 in the mounting ring 50. Referring also to FIG. 12. the bolts 42 are slidably received by associated bores 62 in the gauging cylinder and allow the gauging cylinder block 58 to slide towards and away from the mounting ring 50. The gauging cylinder is biased towards the mounting ring 50 by compression springs 64 (shown best in FIG. 12) which are located in cylindrical pockets 66 which, as seen in FIG. 9, applies a force urging the cylindrical gauge portion upwardly (as viewed in FIG. 9).

Figure 7:
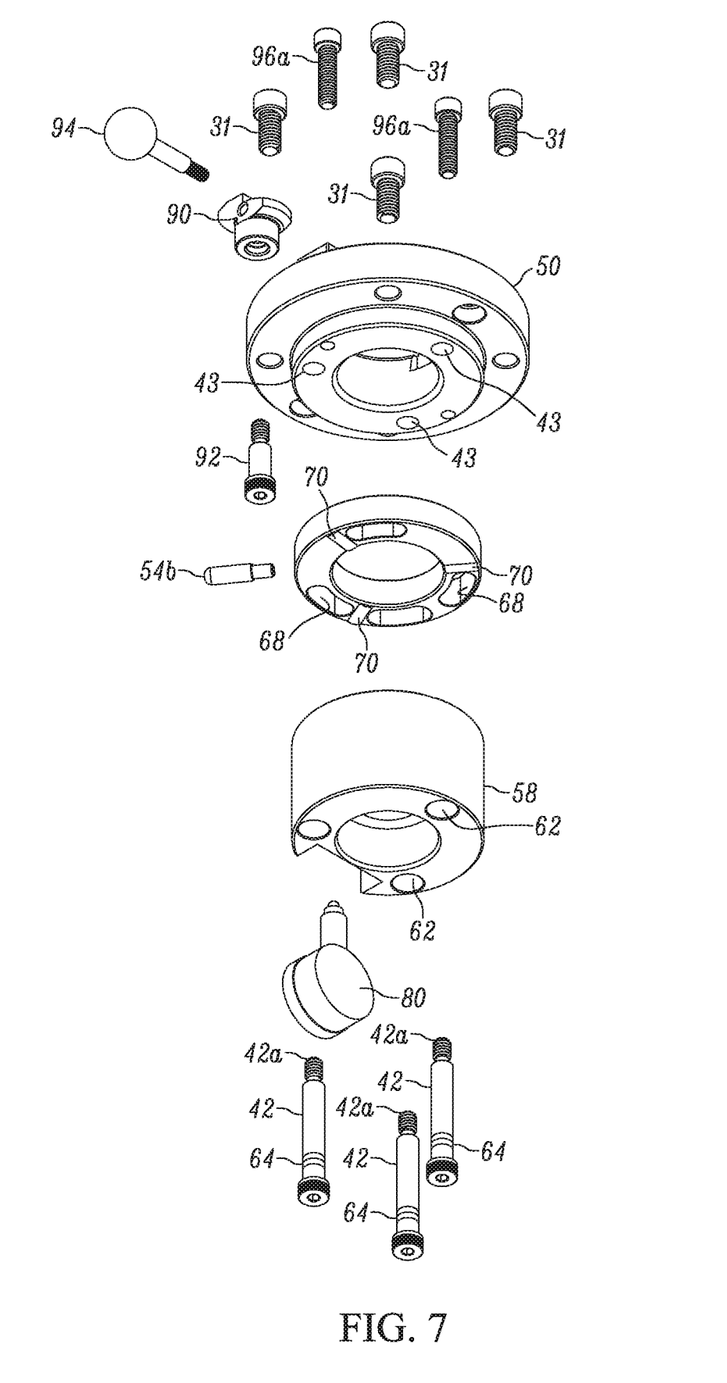
FIG. 7 is another exploded, perspective view of the gauge assembly shown at FIG. 6.
Figure 8:
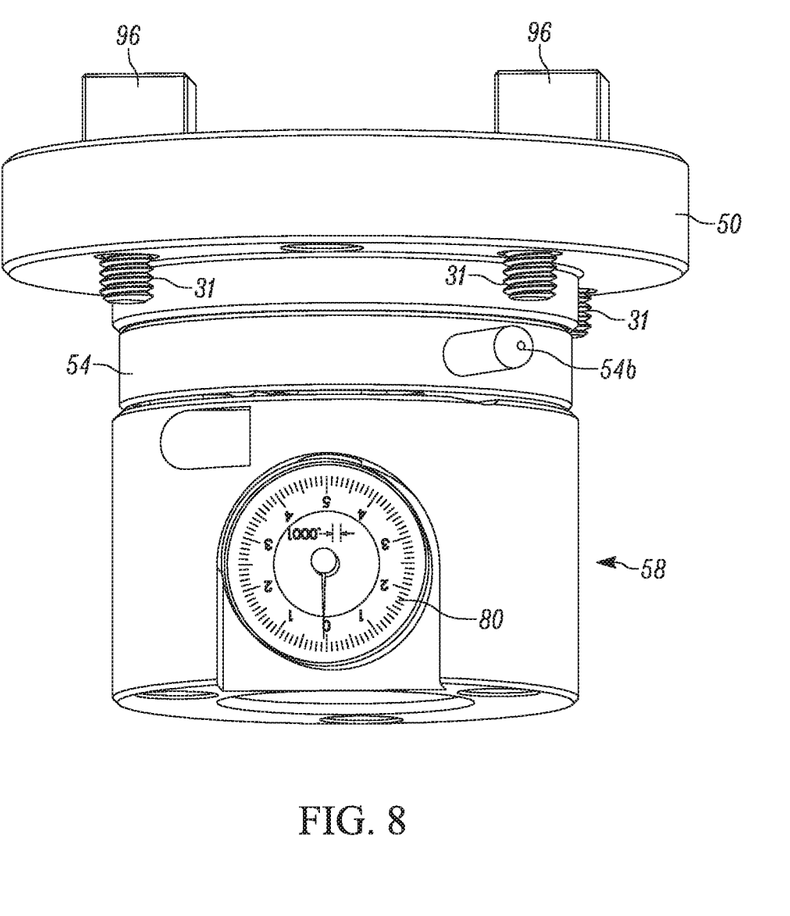
FIG. 8 is a perspective view of the gauge assembly shown in FIG. 7.

The cam ring 54 is rotated in order to move the cylindrical gauging portion 58 downwardly, away from the mounting ring 50, as viewed in FIG. 6. The cam ring includes three curved slots 68 through which the bolts 42 extend. The slots 68 allow the cam ring 54 to rotate relative to the bolts 42. Referring also to FIG. 7, the underside of the cam ring 54 includes three protrusions 70 which are receivable by three complementally-shaped recesses 72 formed in the upper surface of the cylindrical gauge lock 58 (shown best in FIG. 6). When the cam ring is rotated to a position where the protrusions 70 are not received by the recesses 72, the cylindrical gauging block or portion 54 is moved away from the mounting ring 50 by a distance equal to the height of the protrusions 70. When the cam ring 54 is rotated to a position where the protrusions are in the associated recesses 72, the cylindrical gauge portion 58 moves upwardly, towards the mounting ring 50.

A dial indicator 80, as seen in FIGS. 6 and 7, is mounted to the cylindrical gauge block portion 58 and includes an upwardly, axially directed operating member, which includes a plunger tip 80*a* that is engageable with an underside of the mounting ring 50, shown best in FIGS. 2 and 12.

As is similar to the methodology disclosed in U.S. Pat. No. 9,205,524, distortions in the tool holder tapered surface 12*a*, caused by the installation of a retention knob 12*c* are manifested as a change in distance between the cylindrical test gauge portion 58 and the bottom surface of the mounting ring 50 (to which the flange 12*b* of the tool holder 12 is attached to). The test gauge cylinder 58 includes a tapered bore 58*a* which is precisely machined to conform to the tapered surface 12*a* of the tool holder 12. If there are no distortions in the tool holder tapered surface 12*a* (i.e. after installation of the retention know 12*c*), the tapered bore 58*a* in the test gauge cylinder 58 will uniformly receive the tool holder tapered segment 12*a*.

When the tool holder 12 is mounted into the tool holder fixture subassembly 18 and the cam ring 54 is rotated to its testing position (using knob 54*b*), the test gauge cylinder will move upwardly, as viewed in FIG. 1 in order for the tapered bore 58*a* of the gauging cylinder 58 to engage the tapered surface 12*a* of the tool holder 12 (shown in FIG. 12). The dial indicator 80 will indicate a reading indicative of the position of the cylindrical gauging portion 58 that reflects no distortions in the tapered holder 12 because a retention knob 12*c* is not installed. The cam ring 54 is rotated to its release position to cause the gauging cylinder portion to move out of contact with the tapered surface 12*a* of the tool holder 12. The retention knob 12*c* is then installed and the same measurement is made, if the dial indicator indicates that the distance to the bottom surface of the mounting ring 50 has increased, this is an indication that the tapered surface 12*a* of the tool holder 12 has been distorted by the installation of the retention knob 12*c* and this distortion is preventing the cylindrical gauge block 58 to move upwardly to its fully engaged position with the tool holder tapered surface 12*a*.

In the preferred methodology, a tool holder to be checked is installed into the testing fixture subassembly 18. Referring to FIG. 12, a locking member 90 is rotated to engage the flange 12*b* and thus lock the tool holder 12 to the mounting ring 50. The locking member 90 is rotatably attached to the mounting ring 50 by a pin 92 having a threaded end. The cam ring 54 includes a clearance slot 68*a* through which the pin 92 extends. To facilitate this clamping, an underside 90*a* (or upper side) of the locking member 90 is tapered or cammed so that as it is rotated (by lever arm/knob 94—see FIG. 6), the clamping force exerted by the locking member on the flange 12*b* increases. The cam ring 54 is then rotated to its testing position and the dial indicator 80 reading is noted. The cam ring 54 is then rotated to its non-testing or release position whereby the gauging cylinder 58 is moved downwardly and out of contact with the tapered segment 12*a* of the tool holder 12. A retention knob 12*c* is then suitably installed in the tool holder 12. The cam ring 54 is then rotated to its test position, allowing the gauging cylinder 58 to move upwardly to allow the tapered bore 58*a* of the cylindrical portion 58 to engage the tool holder tapered surface 12*a*. If the dial indicator reading is substantially the same as noted prior to installation of the retention knob 12*c*, this is an indication that the installation of the retention knob 12*c* did not distort the tool holder tapered surface 12*a*. If, on the other hand, the dial indicator 80 produces a reading indicating that the gauging cylinder 58 was not able to move upwardly to its original position, then the retention knob 12*c* was wrongly configure, or the improper torque was applied to the retention knob during installation.

As noted above an operating lever/knob 94 is threadedly received by the tool holder clamping member 90 and facilitates rotation. In the illustrated embodiment, the locking member 90 includes at least two different configurations to accommodate two different types of tool holders and, thus, by rotating the locking knob 180°, different styles of tool holders can be accommodated.

The cam ring 54 includes the radially extending knob 54*b* to facilitate rotation of the cam ring 54. Referring to FIGS. 1, 3, 4, 6 and 10, the mounting ring 50 includes a pair of upwardly extending keys 96 (held to the mounting ring by Allen bolts 96*a*) which are engageable with notches 97 in the tool holder 12 and which prevent rotation of the tool holder 12 when mounted to the test fixture subassembly 18.

According to a feature of the invention, the gauge/testing assembly 40 is initially machined as a single unit. In particular the overall external configuration is machined out of a single unitary block of material (steel or aluminum). At least the bores 62 that receive the clamping bolts 42 are machined into the single block of material. The threaded bores 42*a* are also machined into this initial block of material. Other bores/surfaces may be machined into the single block of material.

According to the invention, the single block is then sawed or cut into the three individual pieces, namely, the mounting ring 50, the cam ring 54 and the cylindrical gauging portion 58. These individual pieces are then machined to form the individual configurations and structures shown in the drawing. However, by initially machining at least the bores 62 and 43 in the initial block of material before it is sliced into the individual components, the components are precisely aligned when the bolts 42 are installed to clamp the components together after they are individually machined. If the mounting ring 50, cam ring 54 and cylindrical gauging portion 58 were individually machined, precise alignment of these components, when assembled, would be much more difficult.

Although the invention has been described with a certain degree of particularity, those skilled in the art can make various changes to it without departing from the spirit or scope of the invention as hereinafter claimed.

We claim:

1. A tapered tool holder test fixture for determining whether a surface forming part of a tool holder, has been distorted, said fixture comprising a support stand supporting a test gauge assembly, said assembly comprising a tool holder mount to which a tool holder is rigidly attached, a gauge block engageable with a surface forming part of said tool holder and a camming member for moving said gauge block into engagement with said tool holder surface, said tool holder mount, gauge block and camming member held together by a plurality of longitudinal extending bolts, said bolts arranged to allow said gauge block to move towards and away from said tool holder, said camming member movable between a tool holder engaged position and a tool holder disengaged position and a measuring indicator for monitoring a position of said gauge block with respect to a reference point on said tool holder when said gauge block is engaging said surface of said tool holder.

2. The tapered tool holder test fixture of claim 1 wherein said tool holder mount, gauge block and camming member are axially aligned with a common axis and said camming member is rotatable about said axis to cause said gauge block to move towards and away from said tool holder surface held by said tool holder mount.

3. The tapered tool holder test fixture of claim 2 further including a detent structure comprising at least one detent and at least one associated recess for receiving said detent arranged such that relative movement between said detent and said associated recess causes said gauge block to move towards and away from said tool holder held by said tool holder mount.

4. The tapered tool holder test fixture of claim 3 wherein said detent is formed on said camming member and said associated recess is formed on said gauge block.

5. The tapered tool holder test fixture of claim 4 wherein said camming member includes three detents and said gauge block includes three recesses associated with said three detents.

6. The tapered tool holder test fixture of the claim 1 wherein said camming member includes arcuate slots through which said longitudinal extending bolts extend, said slots allowing said camming member to rotate a predetermined amount with respect to said tool holder mount and said gauge block.

7. The tapered tool holder test fixture of claim 1 wherein said support stand rotatably supports said test gauge assembly.

8. The tapered tool holder test fixture of claim 7 further including a spring-loaded locking pin operative to lock said test gauge assembly in one of several rotated positions.

9. The tapered tool holder test fixture of claim 1 wherein said tool holder, gauge block and camming member are initially formed from a unitary block of material, said block of material machined to define the exterior radial surfaces of said tool holder, gauge block and camming member, and bores for said longitudinal extending bolts are machined into said block whereupon, said block is then machine cut into three individual pieces that define the tool holder mount, gauge block and camming member.

10. The tapered tool holder test fixture of claim 1 wherein said gauge block is biased toward engagement with said tool holder surface by a plurality of springs held by said longitudinal extending bolts.

11. The tapered tool holder fixture of claim 10 wherein said tool holder, gauge block and camming member are held together by three longitudinally extending bolts, each bolt carrying a biasing spring for urging said gauge block towards engagement with a tool holder held by said tool holder mount.

12. The tapered tool holder test fixture of claim 1 wherein said tool holder mount includes a rotatable locking member which defines a tapered clamping surface engageable with a tool holder positioned in said tool holder mount and operative to apply a clamping force to said tool holder when said locking member is rotated.

13. The tapered tool holder test fixture of claim 12 wherein said locking member includes at least two different clamping configurations whereby different types of tool holders can be accommodated, said locking member rotatable 180° in order to cause one of said two configurations to engage a tool holder positioned in said tool holder mount.

14. The tapered tool holder test fixture of claim 12 wherein said clamping surface engages a flange forming part of said tool holder positioned in said tool holder mount.

15. The tapered tool holder test fixture of claim 12 wherein said locking member is rotatably held to said tool holder mount by a pin that extends through an associated arcuate slot formed in said camming member.

16. The tapered tool holder test fixture of claim 1 further including at least one key extending from said tool holder mount that is engageable with a notch formed in a tool holder flange and which is operative to inhibit relative rotation between a tool holder and said tool holder mount, when said tool holder is held by said tool holder mount.

17. A tapered tool holder fixture assembly, comprising a support stand rotatably supporting a test gauge assembly, said assembly comprising a mounting ring, a camming ring and a cylindrical gauging portion held together by a plurality of longitudinal extending bolts which allow said cylindrical gauge portion to move towards and away from said mounting ring and said camming ring including slots to allow said camming ring to rotate relative to said mounting ring and said gauging cylinder portion and further including a detent operative to cause said cylindrical gauging portion to move towards and away from said mounting ring when said camming ring is rotated and a measuring indicator for determining whether a surface on a tool holder has been distorted after a retention knob has been installed by monitoring a position of said cylindrical gauging cylinder when said gauging cylinder is in engagement with said tool holder surface.

18. The tapered tool holder fixture assembly of claim 17 wherein said detent comprises a protrusion carried by said camming ring which is engageable with an associated recess defined by said cylindrical gauging portion such that when said protrusion is received by said recess, said cylindrical gauging portion moves towards and into engagement with said surface on said tool holder and being further operative to cause said cylindrical gauging portion to disengage said tool holder surface when said protrusion is moved out of said associated recess.

* * * * *